United States Patent [19]

Lundquist et al.

[11] Patent Number: 4,623,867
[45] Date of Patent: Nov. 18, 1986

[54] PERMANENT MAGNET BIASED NARROW TRACK MAGNETORESISTIVE TRANSDUCER

[75] Inventors: Jerry R. Lundquist, San Jose; H. Neal Bertram, Palo Alto, both of Calif.

[73] Assignee: Ampex Corporation, Redwood City, Calif.

[21] Appl. No.: 640,432

[22] Filed: Aug. 13, 1984

[51] Int. Cl.⁴ ............................................. H01L 43/00
[52] U.S. Cl. .............................. 338/32 R; 338/32 H; 360/113
[58] Field of Search .......................... 338/32 R, 32 H; 360/110, 113, 125, 127

[56] References Cited

U.S. PATENT DOCUMENTS

| 3,921,218 | 11/1975 | Kayser | 360/113 |
| 4,097,802 | 6/1978 | Mahopac | 338/32 R X |
| 4,103,315 | 7/1978 | Hempstead et al. | 360/113 X |

Primary Examiner—E. A. Goldberg
Assistant Examiner—M. M. Lateef
Attorney, Agent, or Firm—Elizabeth E. Strnad; Joel D. Talcott

[57] ABSTRACT

A narrow track magnetoresistive transducer has a square shaped bias permanent magnet superposed with an MR element. The square shaped magnet provides bias field components of substantially the same magnitude in both hard and easy axis directions of the MR element. A stable and uniform bias field is thereby obtained.

10 Claims, 7 Drawing Figures

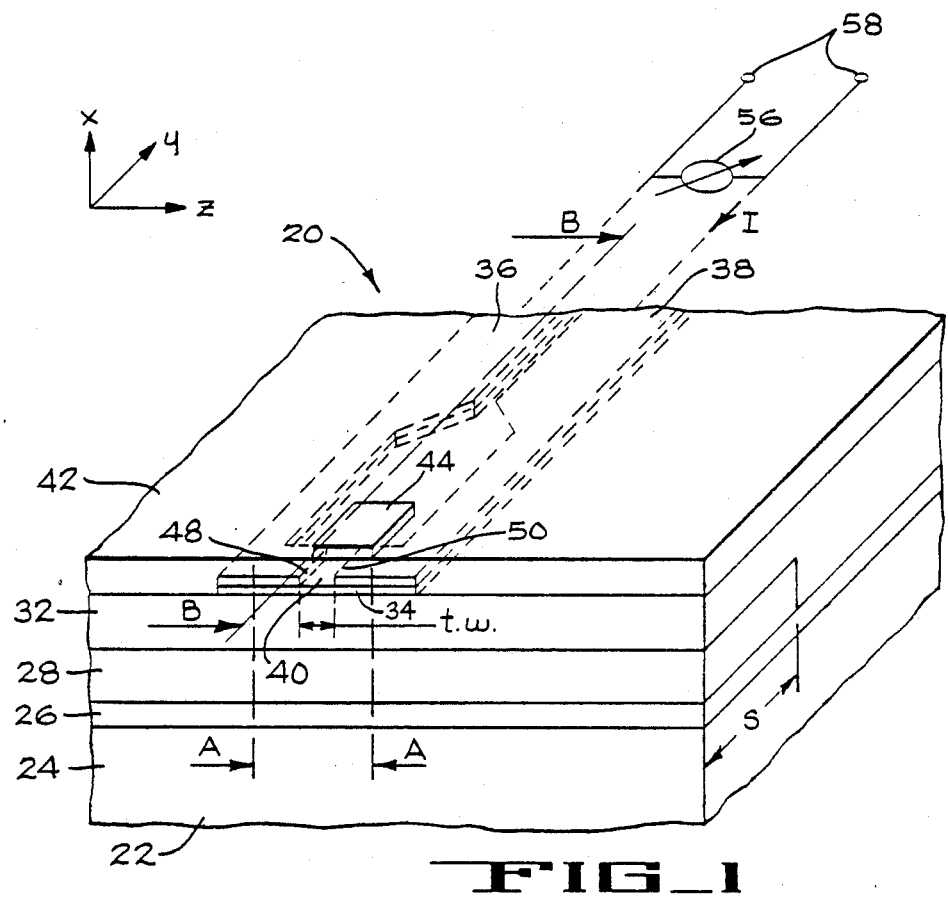
FIG_1
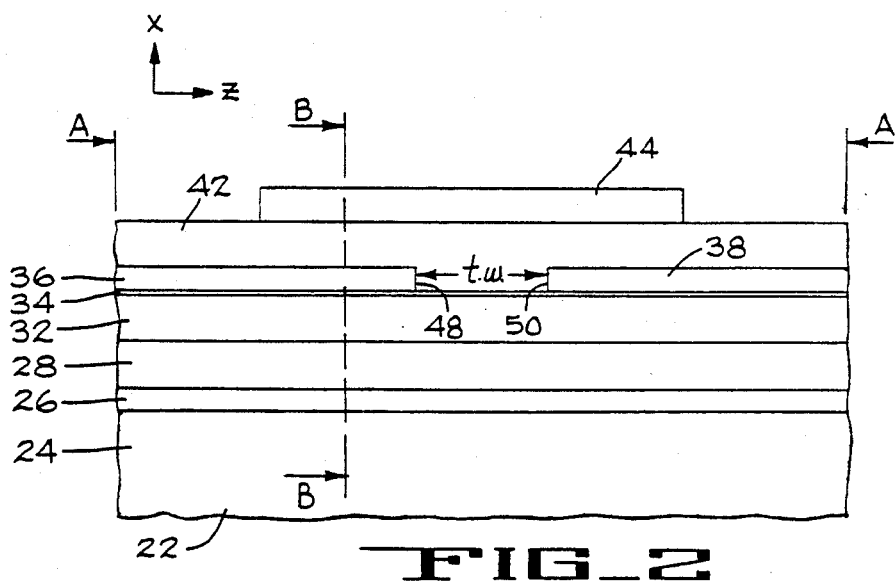
FIG_2

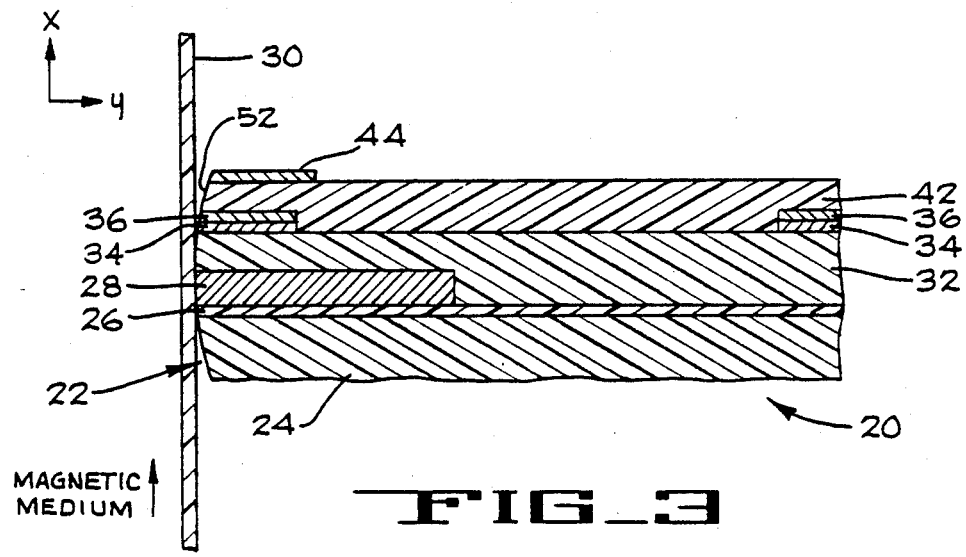
FIG_3
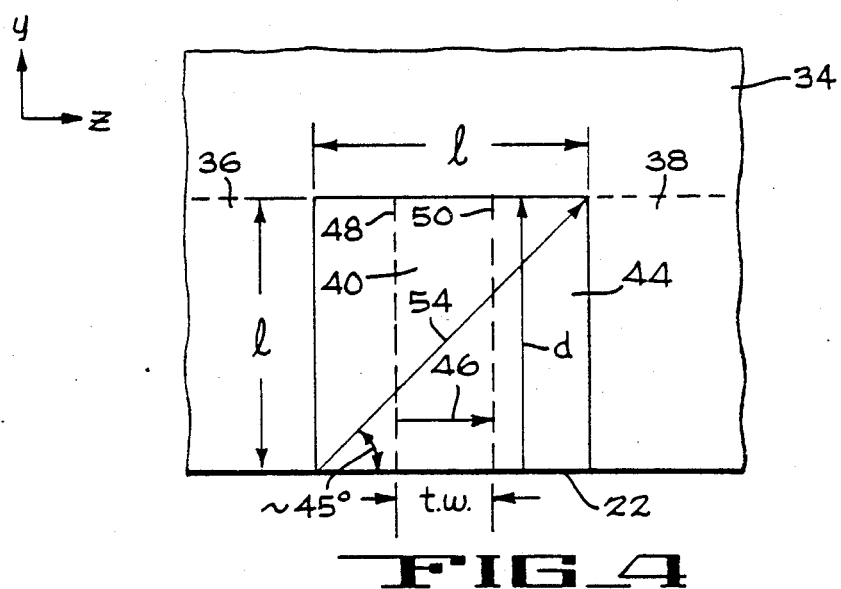
FIG_4

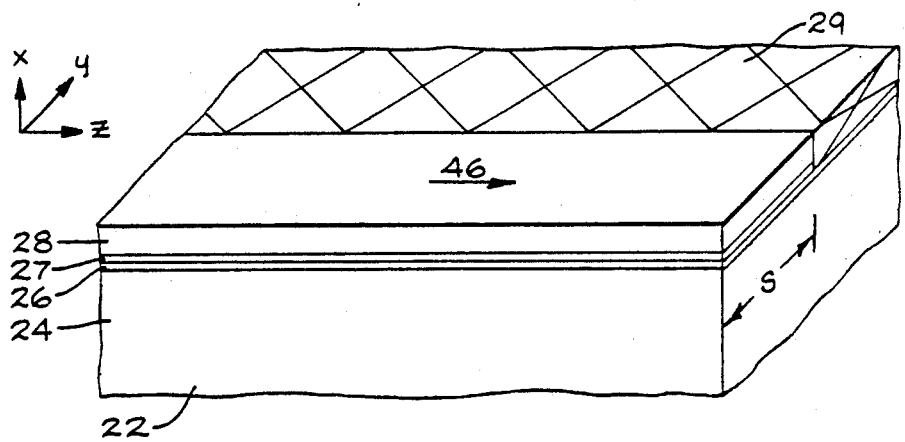
FIG_5
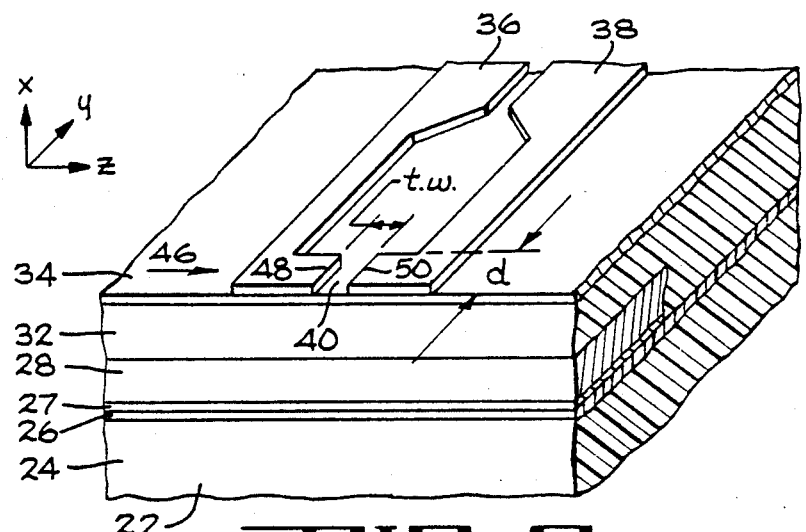
FIG_6
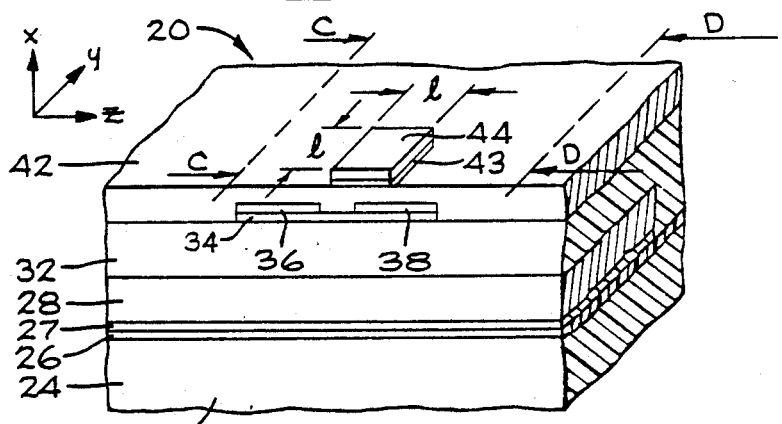
FIG_7

PERMANENT MAGNET BIASED NARROW TRACK MAGNETORESISTIVE TRANSDUCER

The Government has rights in this invention pursuant to Contract No. F33657-81-C-1032 awarded by the U.S. Government.

BACKGROUND OF THE INVENTION

This invention relates to magnetoresistive transducers having a permanent magnet bias, which transducers are particularly useful for reproduction of signals recorded on narrow tracks of a magnetic medium.

Magnetoresistive transducers are known in the art of reproducing information signals from magnetic tape, disc, card, sheet or other magnetic medium. These transducers comprise a magnetoresistive element, further referred to as MR element, in the form of an elongated narrow strip. The strip is made of a low anisotropy ferromagnetic material which has an easy axis of magnetization oriented usually along a length thereof. In accordance with the well known magnetoresistance effect, the strip exhibits a change in resistivity which is caused by a change in the direction of magnetization thereof, in response to a changing magnetic field externally applied thereto. Because of the well known nonlinearity of the response curve, it is necessary to apply a magnetic bias field to the MR element to obtain operation within a linear portion of the curve. The magnitude of the output signal from the MR element is proportional to its length which, in turn, corresponds to the recording track width. Therefore linearizing the response and maximizing the sensitivity of the MR element are particularly important in connection with reproduction from high storage density magnetic medium where the recording track width is reduced to a minimum.

Various known methods of biasing MR elements include utilizing an external bias magnet, providing conductive strips for carrying sense current at 45 degrees to the longitudinal axis of the element, and providing an internal biasing permanent magnet layer of high coercivity magnetic film integrally within the magnetoresistive transducer structure. Use of the integral magnetic layer has apparent advantages over other biasing methods as follows. It simplifies the structure and thus the manufacturing process of the MR transducer assembly. Furthermore, it is an improvement over the use of external biasing magnets which do not allow the use of magnetic shields. Such shields are interposed between the magnet and MR element and thus they would interfere with the bias field.

Internally biased prior art magnetoresistive transducers have a high coercivity permanent magnet biasing layer arranged within the transducer structure in the shape of an elongated strip matching the shape of the MR element superposed therewith. To obtain a linear change in resistivity of the MR element with a changing magnetic field applied thereto, it has been necessary to magnetize the permanent magnet layer at approximately 45 degrees with reference to its length. The direction of the length corresponds to the easy axis of magnetization of the MR element. However, due to the well known properties of these longitudinally shaped permanent magnets, which generally have an aspect ratio from 6:1 to 20:1, a relatively large bias field component has been provided in the direction of the depth of the magnet while a relatively small bias field component has been provided in the direction of its length. Consequently, the bias field component applied to the underlying MR element in the easy axis direction has a considerably smaller magnitude when compared to a component directed perpendicularly thereto. As an example, an estimated magnitude of the field in easy axis direction is 15 Oe while a corresponding magnitude in the hard axis direction is 100 Oe, approximately.

Under these conditions the internal bias magnet cannot provide a sufficiently strong and stable magnetization of the MR element at 45 degrees and deterioration in the linearity of signal response results. In addition, the thusly biased MR element is very sensitive to external stray fields.

Laboratory tests performed on a prior art magnetoresistive transducer having an elongated biasing permanent magnet strip indicate strong sensitivity to externally applied D.C. stray fields. As an example, such an MR element has been excited by an A.C. signal field of 40 Hz, 2 Oe and a D.C. stray field in the range between ±10 Oe was applied thereto. Typically the MR element exhibited a 10 dB decrease in sensitivity in response to the stray field. In addition, the MR element exhibited a large second harmonic distortion, which is comparable to the signal level, in response to relatively small stray fields of less than 2 Oe.

SUMMARY OF THE INVENTION

The applicants have discovered that the above indicated disadvantages of prior art magnetoresistive transducers are eliminated when an internal biasing thin permanent magnet layer having a substantially square shape is provided. When such thin layer is magnetized at 45 degrees it provides sufficiently strong bias field components of substantially the same magnitude both in the direction of easy and hard axis of magnetization of the MR element. The thusly biased MR transducer of the invention has a sufficiently linear response. In addition, the resulting magnetization of the MR element remains stable at 45 degrees even after leaving the field of the orienting magnet and it is not easily influenced by stray fields.

Laboratory testing of an MR transducer having a square-shaped bias permanent magnet layer in accordance with this invention exhibits a less than 2 dB variation in sensitivity when external stray fields up to ±30 Oe are applied thereto. The second harmonic distortion is also very low, such as −20 dB below the useful signal level in response to the above-indicated stray fields.

BRIEF DESCRIPTION OF THE DRAWINGS

FIG. 1 is a schematic perspective view of a preferred embodiment of the magnetoresistive transducer of the invention.

FIG. 2 is an enlarged front elevation view of a portion of the transducer delineated by the line A—A of FIG. 1.

FIG. 3 is a cross sectional view of the transducer taken along line B—B of FIG. 2.

FIG. 4 is an enlarged fragmentary plan view of a portion of the transducer of FIG. 1; and FIGS. 5 to 7 show various preferred method steps for manufacturing the transducer of FIG. 1.

DETAILED DESCRIPTION

A preferred embodiment of the invention is described below with reference to FIGS. 1 to 4. The MR transducer of the preferred embodiment is manufactured utilizing photolithography and thin film technology, respectively, which techniques are well known in the art.

An orthogonal coordinate system X,Y,Z is shown in the FIGURES to facilitate description of the orientation of various thin film layers of the transducer.

With reference to FIGS. 1 to 4, the MR transducer 20 of the preferred embodiment comprises a substrate 24 of a nonmagnetic nonconductive inert material, for example a silicon wafer, with a layer 26 of silicon dioxide thermally grown thereon to improve insulation properties of the substrate, as it is known in the art. A shield 28 of a magnetically permeable material, for example permalloy, is preferably deposited on the layer 26. The shield 28 extends at a selected depth s in the direction of axis Y, that is, inwardly of a face 22 of the transducer 20 facing a magnetic medium, for example tape 30, shown in FIGURE 3.

A nonmagnetic and electrically insulating layer 32, preferably of aluminum oxide is further provided to form a spacer between the magnetic shield 28 and a following magnetoresistive layer 34. A portion of thin film layer 34 which is deposited over the insulating layer 32 forms the MR element. It is preferably a permalloy layer, approximately 500 Angstrom thick and it extends preferably under the entire surface of conductor leads 36, 38.

Conductor leads 36, 38 for supplying a sense current to MR element 40 are directly deposited on the thin film layer 34 and are in electrical contact therewith. As it is shown in FIGS. 1 and 2, the length of the MR element is designated t.w. and it is defined by the distance between the confronting ends 48, 50 of conductor leads 36, 38 at the face 22 of transducer 20. The length t.w. corresponds to a track width of the transducer as it will be described further.

In the preferred embodiment, the face 22 of the transducer 20 is in contact with the magnetic tape 30. In order to extend the life of the narrow track MR transducer of the invention a depth d of the MR element 40 has been selected approximately 0.001 inch. As it is shown in FIG. 4 the dimension d is defined by the depth of the conductors 36, 38 in the direction of axis Y.

A further electrically insulating nonmagnetic layer 42 is provided on the conductors 36, 38 and on the portion of layer 34, forming the MR element 40. It separates these layers from a following permeable layer which serves as a bias permanent magnet 44. The magnet 44 is superposed with the MR element 40 and it is preferably provided by a layer of cobalt-nickel-phosphorus, for example 16 microinches thick. Preferably, the composition of the magnet 44 is 80% cobalt, 16% nickel and 4% phosphorus. In accordance with the invention the magnet 44 has a substantially equal length and depth l which in the preferred embodiment are selected l=0.001 inch.

FIG. 4 shows the relative arrangement of the MR element 40 and a bias permanent magnet 44, respectively. It is seen from FIG. 4 that a portion of the layer 34 which forms the MR element 40 is defined by the geometry of the conductor leads 36, 38 which are in electrical contact with the underlying MR layer 34. The length of the MR element 40 extends in the direction of axis Z corresponding to easy axis of magnetization indicated by arrow 46. The length of the MR element 40 defines the transducing track width t.w. of the transducer 20. The track width t.w. in the preferred embodiment has been selected 0.0003 inch.

It follows from the foregoing description that the MR layer 34 surrounds the MR element 40 and it is contiguous therewith. A portion of the MR layer which is immediately adjacent to the MR element 40 and is coextensive with the conductor leads 36, 38 is effectively electrically shorted with these leads. However the shorted portion of layer 34 remains magnetically active. Therefore, a portion of layer 34 which is coextensive with the permanently magnetized bias magnet 44 becomes magnetized in a desired direction of magnetization defined by the permanent magnet 44. Thereby the uniformity and stability of the bias magnetization in the MR element is further improved along the edges thereof.

The completed transducer 20 is placed in a large magnetic field typically provided by a D.C. electromagnet (not shown) at a magnitude of several thousand Oersteds. The transducer is oriented within the field such that the bias permanent magnet 44 becomes permanently magnetized to have a direction of magnetization oriented at 45 degrees with respect to the easy axis of magnetization 46 of the MR element 40. The resulting direction of magnetization of magnet 44 is shown by arrow 54 in FIG. 4.

As it has been described previously, the field from the internal bias permanent magnet 44 magnetizes the MR element 40 superposed therewith also in the direction 54, that is at 45 degrees to the easy axis direction 46, thereby providing a desired direction of bias magnetization therein as previously described. As it is shown in FIG. 1 a D.C. sense current I is supplied from source 56 via conductors 36, 38 to the MR element 40. In accordance with the well known properties of magnetoresistive materials, the magnetic fields originating from signals recorded on an adjacent magnetic medium, for example tape 30 shown in FIG. 3, rotate the magnetization of the MR element, thereby causing a change in its resistance. The resulting output signal from the MR transducer 20 is measured as a voltage change across the MR element 40, for example by connecting a high impedance voltmeter (not shown) at terminals 58 as well known in the art.

It is noted that while the preferred embodiment of the invention has been described as having one magnetic shield, the invention is not limited to that embodiment. Alternative embodiments with no shields or two shields can be made. In the latter case a second magnetic shield may be provided adjacent to an outer planar surface of the bias permanent magnet opposite to the surface facing the MR element. Such shield must be properly separated from the previously deposited conductive and magnetic layers. As a further alternative to the above described preferred embodiment a single shield may be located adjacent to the outer planar surface of the bias magnet, opposite to the surface facing the MR element.

It will be appreciated that prior art MR transducers utilizing internal permanent magnet bias did not yield output signals of sufficient magnitude and linearity at narrow track widths in the order of less than 0.001 inch. Actual test results performed on a MR transducer of the invention having a 0.0002 inch track width showed stable reproducible output voltages and low harmonic distortion of less than −20 dB when selected recorded wavelengths from approximately 500 microinches to approximately 64 microinches have been reproduced from a prerecorded magnetic tape. A typical output voltage of 15 microvolts has been obtained at a 100 microinch wavelength.

Now a preferred method of making an MR head in accordance with the present invention will be described with reference to FIGS. 5 to 7.

A substrate 24 of a suitable nonmagnetic nonconductive inert material is prepared, for example a silicon wafer, which in the the preferred embodiment may be in the form of a circular plate, for example 2 inches in diameter. Preferably a large number of MR heads (not shown) in accordance with the present invention are manufactured simultaneously on a single substrate. For example, approximately 350 transducers can be made during a single batch fabrication process on the same wafer. Because such thin film batch fabrication techniques are well known in the art, the following method will be described with respect to manufacturing a single transducer to simplify the description.

To improve electrical insulation between the silicon substrate 24 and subsequent conductive layers to be deposited thereon, a layer 26 of silicon dioxide, approximately 2500 Angstroms thick is thermally grown on the substrate 24 utilizing techniques well known from the thin film manufacturing technology.

The surface of the layer 26 is cleaned, for example by a solution of hydrofluoric acid in water, and then dried in nitrogen atmosphere. This cleaning step is essential since it removes about 100 Angstroms of the silicon dioxide layer and therewith the contaminants which may have formed on the wafer during storage and handling. Thereafter a layer 27 of an electrically conductive material, preferably copper, approximately 5 microinches thick is deposited, preferably by sputtering in vacuum on the clean surface 26. The sputtering may be performed by a well known sputtering system, for example Model 2400-8SA manufactured by Perkin-Elmer Corporation. The copper layer 27 acts as current conductor during a following electroplating process, as it is known in the art. The thin conductive layer 27 does not influence the transducing operation of the MR transducer 20.

It is noted that the conductive layer 27 as well as a similar conductive layer 43, which will be described later, are not shown in FIGS. 1 to 4 for better clarity of representation.

With further reference to FIG. 5, the next step is deposition of a magnetic shield material 28, for example permalloy, 40 microinches thick preferably by electroplating in an orienting magnetic field utilizing well known electroplating techniques. The orientation of the field is such that the shield is magnetized in parallel with a desired direction 46 of the easy axis of magnetization of the MR element 40. To obtain a rectangular shield 28 of a desired depth s extending inwardly from a face 22 of the transducer assembly, the copper layer 27 is first covered with a suitable photoresist material, for example positive photoresist Waycoat HPR-206, manufactured by Hunt Chemicals Corporation. A rectangular mask (not shown) in the desired shape of shield 28 shown in FIG. 5 is photographed thereon. The exposed wafer surface is then developed as well known in the art of photolithography. The unmasked area is thereafter ion milled to remove the excess permalloy and copper layers down to the silicon dioxide layer 26. The removed area is shown in FIG. 5 as a cross-hatched area 29.

With further reference to FIG. 6 a nonmagnetic and electrically insulating layer 32, for example aluminum oxide, 40 microinches thick is vacuum sputtered on the top surface of shield 28 and on a portion of surface 26 not covered by the shield 28, for example utilizing the previously mentioned Perkin-Elmer sputtering system.

A thin film of magnetic material forming the magnetoresistive layer 34 is deposited on the layer 32, preferably by vacuum evaporation in an orienting magnetic field in a well known manner. The material of layer 34 is selected to have a high magnetoresistive coefficient, a low magnetic anisotropy and the layer is sufficiently thin to obtain desired large changes in resistivity with an applied external magnetic signal field. The selected material of layer 34 is preferably permalloy having a layer thickness of 500 Angstrom. The orientation of the magnetic field is in the direction 46 to obtain a desired easy axis of magnetization of the MR element in parallel with its length.

With further reference to FIG. 6, the conductor leads 36, 38 are formed in direct contact with the permalloy layer 34 as follows. The permalloy layer 34 is coated with a suitable photoresist, as previously described with reference to providing layer 28. A suitable mask (not shown) in the shape of the desired conductor leads 36, 38, as shown in FIG. 6, is then photographed on the photoresist. After developing the resulting photo image, copper is electrodeposited on the areas where the conductors 36, 38 are to be formed, to a thickness of 10 microinches. The photoresist is then stripped and the entire surface is again recoated with a new layer of photoresist. A new mask (not shown) is now photographed to protect the copper leads 36, 38 and the magnetoresistive layer 34 between the ends of the copper leads with a continuous photoresist layer after developing. The excess permalloy layer 34 in the unmasked areas is then removed preferably by ion milling. FIG. 6 shows the above-described manufacturing step prior to the ion milling process.

As it has been previously described with reference to FIG. 4, the effective length t.w. of the MR sensor element 40 in the direction 46 of easy axis of magnetization is defined by a distance between the confronting ends 48, 50 of conductors 36, 38. The depth d of the MR element 40 is defined by a depth of the conductor leads 36, 38 in the direction of axis y. In the preferred embodiment d is approximately 0.001 inch.

As an example, a desired narrow transducing track width t.w. in the preferred embodiment is selected 0.0003 inch. It will be appreciated that in the preferred method of manufacturing the MR transducer, the length of the magnetoresistive layer 34 in the direction of easy axis of magnetization 46 largely exceeds the length of the active MR element 40. Therefore the desired narrow track width is easily obtained by selecting a desired spacing between the ends 48, 50 of conductors 36, 38 deposited on the MR layer 34, which spacing corresponds to that track width.

In accordance with a following method step and with reference to FIG. 7 a nonmagnetic spacer and electrically insulating layer 42, for example aluminum oxide, 20 microinches thick, is deposited preferably by sputtering on top of the previously deposited layers 34, 36 and 38, utilizing similar method steps as it has been described with respect to depositing layer 32. Layer 42 separates the underlying layers from a subsequent layer 44 which serves as a biasing permanent magnet and which is deposited as follows.

First a layer of an electrically conductive material 43, preferably copper, 9 microinches thick is sputtered on the entire surface of the previously deposited layer 42, utilizing similar techniques as it has been described with respect to depositing layer 27. Then the sputtered layer 43 is coated with a layer 44 of permanent magnet material, preferably it is sheet plated with a solution of 80% cobalt, 16% nickel and 4% phosphorus, to obtain a layer 16 microinches thick, utilizing well known electroplating techniques.

The obtained layer 44 is then coated with a suitable photoresist, similarly as during the previously described method steps. A square-shaped mask (not shown) in a desired shape of the bias magnet 44, as shown in FIG. 7, is photographed on the photoresist and the obtained image is developed in a well known manner. The unmasked areas are ion milled utilizing known ion milling techniques until both layers 43, 44 are removed from the areas not covered by the mask. In the preferred embodiment the length and depth of the square bias magnet 44 are both selected $1 = 0.001$ inch.

The resulting MR transducer structure is shown in FIG. 7. It corresponds to the previously described preferred embodiment of the MR transducer assembly of FIG. 1.

The thusly obtained MR transducer assembly 20 of FIG. 7 is diced along parallel lines C—C, D—D to obtain a desired overall transducer size. When batch fabricating a number of transducers on the same substrate 24, as previously mentioned, they become separated from each other by necessary dicing steps. The resulting MR transducer 20 is lapped and contoured at the face portion 22 to obtain a desired contour as shown for example at 52 in FIG. 3.

It will be understood by those skilled in the art that in order to provide sufficient material for lapping and contouring operations at the transducer face 22, the substrate 24 and the respective layers deposited thereon should be made to have a depth exceeding a desired final depth of the finished transducer.

Although the invention has been described in conjunction with preferred embodiments, it will be appreciated that modifications and changes may be made without departing from the spirit and scope of the invention as defined by the appended claims.

What is claimed:

1. A magnetoresistive transducer for detecting signals recorded on a magnetic medium, comprising:
    a magnetoresistive element having an easy axis of magnetization;
    a pair of conductor leads having confronting ends in contact with said element, said confronting ends being spaced from each-other to define a length of said element in said easy axis direction; and
    a substantially square shaped bias permanent magnet superposed with said magnetoresistive element for providing a substantially uniform magnetic bias field at a selected angle with respect to said easy axis of magnetization of the magnetoresistive element.

2. The magnetoresistive transducer of claim 1 wherein said permanent magnet provides said magnetic bias field oriented at substantially 45 degrees with respect to said easy axis of magnetization.

3. The magnetoresistive transducer of claim 1 further comprising at least one magnetic shield superposed with said magnetoresistive element and arranged on an outer side of at least one of said magnetoresistive element and said bias permanent magnet, respectively.

4. The magnetoresistive transducer of claim 1 wherein said magnetoresistive element is formed as a portion of a magnetoresistive layer deposited on a substrate and wherein said conductor leads are deposited directly on said magnetoresistive layer, said conductor leads having a selected depth in a direction perpendicular to said easy axis of magnetization to define a depth of said magnetoresistive element.

5. The magnetoresistive transducer of claim 1 wherein said substantially square shaped bias permanent magnet has a length substantially equal to a depth thereof and which length and depth are at least equal to said length of said magnetoresistive element.

6. The magnetoresistive transducer of claim 4 wherein said length of said magnetoresistive element is less than 0.001 inch.

7. A magnetoresistive transducer for detecting signals recorded on a magnetic medium, comprising:
    a magnetoresistive layer having an easy axis of magnetization;
    a pair of conductor leads provided on said magnetoresistive layer in contact therewith, said leads having confronting ends spaced at a selected distance from each-other to define a length of a magnetoresistive element in parallel with said easy axis of magnetization and wherein said leads have a depth defining a depth of said magnetoresistive element in a direction perpendicular to said easy axis of magnetization; and
    a bias permanent magnet layer superposed with said magnetoresistive element and having a substantially equal length and depth which are at least equal to said length of said magnetoresistive element and which are smaller than a length of said magnetoresistive layer in the easy axis direction.

8. The magnetoresistive transducer of claim 7 wherein said bias permanent magnet provides a bias field oriented at substantially 45 degrees with respect to said easy axis of magnetization.

9. A magnetoresistive transducer for detecting signals recorded on a magnetic medium; comprising:
    a magnetoresistive element having an easy axis of magnetization;
    a pair of conductor leads provided in contact with said element and having confronting ends spaced at a selected distance from each-other to define a length of said magnetoresistive element in a direction of said easy axis of magnetization; and
    a bias permanent magnet layer superposed with said magnetoresistive element and having a substantially equal length and depth which are at least equal to said length of said magnetoresistive element and wherein said bias permanent magnet provides a bias field oriented at substantially 45 degrees with respect to said easy axis of magnetization.

10. A magnetoresistive transducer for detecting signals recorded on a magnetic medium, comprising:
    a magnetoresistive element supported by a substrate and having a known direction of easy axis of magnetization;
    a pair of conductor leads provided in direct contact with said element and having confronting ends spaced at a selected distance from each-other to define a length of said magnetoresistive element in said easy axis direction;
    a substantially square shaped bias permanent magnet layer superposed with said magnetoresistive element, said magnet having a substantially equal length and depth which are at least equal to said length of said magnetoresistive element, said magnet providing a bias field oriented at substantially 45 degrees with respect to said easy axis of magnetization; and at least one magnetic shield superposed with said magnetoresistive element and arranged on an outer side of at least one of said magnetoresistive element and said bias permanent magnet, respectively.

* * * * *